US008658074B2

(12) United States Patent
Downton et al.

(10) Patent No.: US 8,658,074 B2
(45) Date of Patent: Feb. 25, 2014

(54) AUTOMATIC ELASTOMER EXTRUSION APPARATUS AND METHOD

(75) Inventors: Geoff Downton, Minchinhampton (GB); Lawrence Lee, Hardwicke (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 13/204,949

(22) Filed: Aug. 8, 2011

(65) Prior Publication Data

US 2012/0045576 A1   Feb. 23, 2012

Related U.S. Application Data

(62) Division of application No. 11/496,563, filed on Jul. 31, 2006, now abandoned.

(51) Int. Cl.
*B29C 45/14* (2006.01)
*B05D 3/00* (2006.01)
*B05C 11/00* (2006.01)
*F01C 1/10* (2006.01)

(52) U.S. Cl.
USPC ............... 264/279; 264/176.1; 264/209.1; 264/209.2; 264/209.6; 264/212; 264/259; 264/271.1; 264/275; 264/279.1; 427/140

(58) Field of Classification Search
USPC ............ 264/177.1, 177.16, 177.17, 177.18, 264/177.19, 176.1, 209.1, 209.2, 209.6, 264/212, 259, 271.1, 275, 279, 279.1; 427/140; 29/888.021; 419/48; 118/72, 118/305
See application file for complete search history.

(56) References Cited

U.S. PATENT DOCUMENTS

| | | | | |
|---|---|---|---|---|
| 1,892,217 | A | | 12/1932 | Moineau |
| 2,858,555 | A | * | 11/1958 | Medovick ................. 15/88 |
| 2,894,539 | A | * | 7/1959 | Cook et al. .............. 138/97 |
| 3,557,403 | A | | 1/1971 | Lemelson |
| 4,207,037 | A | * | 6/1980 | Riordan ................... 418/48 |
| 4,455,133 | A | | 6/1984 | Jakob et al. |
| 4,677,935 | A | * | 7/1987 | Fusi et al. ............... 118/108 |
| 4,677,998 | A | * | 7/1987 | van Voskuilen et al. ...... 134/181 |
| 4,953,496 | A | * | 9/1990 | Taylor et al. ............ 118/72 |
| 4,982,473 | A | * | 1/1991 | Farris et al. ............ 15/256.6 |
| 5,171,138 | A | * | 12/1992 | Forrest ................... 418/48 |
| 5,520,734 | A | * | 5/1996 | Taylor et al. ............ 118/307 |

(Continued)

OTHER PUBLICATIONS

Canadian Examination Report dated Dec. 15, 2011 for corresponding CA application No. 2,595,690.

*Primary Examiner* — Christina Johnson
*Assistant Examiner* — Atul P. Khare
(74) *Attorney, Agent, or Firm* — Kimbery Ballew (57) ABSTRACT

The present invention relates to an automatic elastomer extrusion apparatus and method. An apparatus 400 for in-situ extrusion of an elastomeric coating 410 on a profiled helical surface 450 can include a template (100, 200) forming a gap between the profiled helical surface 450 and an adjacent profiled helical surface (102, 202) of a template (100, 200) itself to extrude an elastomer therethrough. A tracking mechanism 302 and/or carriage 300 can allow a template to follow the contours of the profiled helical surface 350. The apparatus can include means for providing relative movement between the profiled helical surface and the template. The apparatus (500, 600) can include a cleaning module (502, 602), an adhesive application module (504, 604), an elastomer deposition module (506, 606), and/or a curing module (508, 608). Each module can further include a template (100, 200) and/or a tracking mechanism 302.

7 Claims, 4 Drawing Sheets

(56) References Cited

U.S. PATENT DOCUMENTS

| | | |
|---|---|---|
| 6,190,583 B1 | 2/2001 | Suemori et al. |
| 6,604,922 B1 * | 8/2003 | Hache .............................. 418/48 |
| 7,517,202 B2 * | 4/2009 | Delpassand .................... 418/48 |
| 7,739,792 B2 * | 6/2010 | Lee et al. ................. 29/888.023 |
| 7,896,628 B2 * | 3/2011 | Sindt et al. ...................... 418/48 |
| 2005/0079083 A1 * | 4/2005 | Lievestro et al. ............... 418/48 |
| 2008/0023863 A1 | 1/2008 | Lee et al. |

* cited by examiner

AUTOMATIC ELASTOMER EXTRUSION APPARATUS AND METHOD

REFERENCE TO RELATED APPLICATION

This application claims priority to U.S. patent application filed Jul. 31, 2006 as Ser. No. 11/496,563 (US Published App. No. 2008-0023123), incorporated herein by reference.

BACKGROUND

The invention relates generally to extruding an elastomer. More particularly, the invention relates to an automatic elastomer extrusion apparatus and a method for extruding an elastomer onto a rotor or inside a stator of a progressive cavity motor or pump.

Progressive cavity pumps or motors, also referred to as a progressing cavity pumps or motors, typically include a power section consisting of a rotor with a profiled helical exterior surface disposed within a stator with a profiled helical interior surface. The rotor and stator of a progressive cavity apparatus operate according to the Moineau principle, originally disclosed in U.S. Pat. No. 1,892,217.

In use as a pump, relative rotation is provided between the stator and rotor by any means known in the art, and a portion of the profiled helical exterior surface of the rotor engages the profiled helical interior surface of the stator to form a set of sealed chambers or cavities. As the rotor turns eccentrically within the stator, the cavities progress axially to move any fluid present in the cavities.

In use as a motor, a fluid source is provided to the cavities formed between the rotor and stator. The pressure of the fluid causes the cavities to progress resulting in relative rotation between the stator and rotor. In this manner fluidic energy can be converted into mechanical energy.

As progressive cavity pumps or motors rely on a seal between the stator and rotor surfaces, one of or both of these surfaces preferably includes a resilient or dimensionally forgiving material. Typically, the resilient material has been a layer of elastomer disposed on the profiled helical interior surface of the stator, but can be disposed on the profiled helical exterior surface of the rotor. The stator and rotor are typically made of steel.

In use, the heat and stress encountered can cause cracking and other wear of the elastomer. A hydrocarbon or other caustic fluid can cause degradation of the elastomer. Regardless of the cause, it can be desirable to replace or otherwise automatically extrude a layer of elastomer on a profiled helical surface.

SUMMARY

The present invention relates to a method and apparatus for extruding an elastomeric coating on a profiled helical surface or redressing a pre-existing elastomeric coating. An apparatus can include a template having a surface spaced relative to the profiled helical surface to create a gap therebetween, a source of an elastomer in communication with the gap, and at least one tracking mechanism connected to the template and retained against the profiled helical surface. The tracking mechanism can be resiliently held against, or otherwise fixed into contact with, the profiled helical surface. The apparatus can include means for extruding the elastomer through the gap. The apparatus can include means for providing relative movement between the profiled helical surface and the template. The movement can be axial and/or rotational. The at least one tracking mechanism can be at least one wheel. A drive apparatus can be connected to the at least one wheel.

The profiled helical surface can be an interior surface of a stator or an exterior surface of a rotor. The apparatus can further include means for removing a pre-existing elastomeric coating from the profiled helical surface, means for applying an adhesive on the profiled helical surface, and/or means for curing the elastomeric coating. The apparatus can include means for providing relative movement between the profiled helical surface and the apparatus or for providing relative movement between the profiled helical surface and each of the template and the respective means for removing, applying, and curing.

In another embodiment, an apparatus for extruding an elastomeric coating on a profiled helical surface can include a carriage disposed adjacent the profiled helical surface, a cleaning module, an adhesive application module, an elastomer deposition module including a template having a surface spaced relative to the profiled helical surface to create a gap therebetween and a source of an elastomer in communication with the gap, and a curing module each disposed on the carriage, and a traversal apparatus connected to the carriage for traversing the profiled helical surface.

The elastomer deposition module can include means for extruding the elastomer through the gap. The elastomer deposition module can include at least one displacement servo to maintain an orientation of the template relative to the profiled helical surface. The carriage can include at least one displacement servo to maintain an orientation of an assembly of the modules relative to the profiled helical surface. The adhesive application module can include a second template having a surface spaced relative to the profiled helical surface to create a second gap, and a source of an adhesive in communication with the second gap. The adhesive application module can include at least one displacement servo to maintain an orientation of the second template relative to the profiled helical surface.

The cleaning module can be disposed adjacent a first end of the carriage and the curing module adjacent a second end of the carriage, the adhesive application module can be disposed adjacent the cleaning module and the elastomer deposition module can be disposed between the adhesive application module and the curing module. The traversal apparatus can include at least one tracking mechanism resiliently held against the profiled helical surface. The carriage can be rotatable about a longitudinal axis of the profiled helical surface. The apparatus can include a rotational drive apparatus connected to the profiled helical surface to rotate the profiled helical surface during deposition of an elastomer.

The traversal apparatus can include a guide connected to the carriage and following at least one track extending in a straight line parallel to a longitudinal axis of the profiled helical surface as the profiled helical surface is rotated relative to the at least one track. The traversal apparatus can include a drive apparatus connected to the carriage to drive the carriage along the profiled helical surface and/or at least one wheel resiliently held against the profiled helical surface. A drive apparatus can be connected to the at least one wheel to drive the carriage along the profiled helical surface.

In another embodiment, a method of extruding an elastomeric coating on a profiled helical surface can include providing a template having a surface spaced relative to the profiled helical surface to create a gap therebetween, the gap in communication with a source of an elastomer, extruding the elastomer on the profiled helical surface through the gap, and providing relative movement between the profiled helical surface and the template, the template tracking the profiled helical surface with at least one wheel resiliently held against the profiled helical surface. The relative movement can be provided by powering a drive apparatus connected to the at least one wheel.

In yet another embodiment, a method of extruding an elastomeric coating on a profiled helical surface can include disposing a carriage with a cleaning module, an adhesive application module, an elastomer deposition module, and a curing module mounted thereto along the profiled helical surface, removing a pre-existing elastomeric coating with the cleaning module from a section of the profiled helical surface as the carriage is disposed along the profiled helical surface, applying an adhesive with the adhesive application module on the section of the profiled helical surface where the pre-existing elastomeric coating has been previously removed by the cleaning module, extruding an elastomer through a gap formed between a template of the elastomer deposition module and the profiled helical surface on the section of the profiled helical surface where the pre-existing elastomeric coating has been previously removed with the cleaning module and the adhesive has been previously applied with the adhesive application module, and curing the elastomeric coating with the curing module on the section of the profiled helical surface where the cleaning, adhesive application, and elastomer deposition modules have previously removed the pre-existing elastomeric coating, applied the adhesive, and deposited the elastomeric coating. The method can include positioning the template with at least one tracking mechanism connected to the template and resiliently held against the profiled helical surface. The template can be positioned with at least one displacement servo disposed between the template and the carriage.

The cleaning, applying, extruding, and curing steps can occur concurrently to a different portion of the rotor/stator. Relative movement can occur between the carriage and the profiled helical surface during the cleaning, applying, extruding, and curing steps. The method can include providing relative movement between the carriage and each of the cleaning module, the adhesive application module, the elastomer deposition module, and the curing module during the cleaning, applying, extruding, and curing steps.

The method can also include connecting a guide to the carriage, the guide following at least one track extending in a straight line parallel to an axis of the profiled helical surface, connecting at least one tracking mechanism to the carriage, the at least one tracking mechanism resiliently held against the profiled helical surface, and imparting relative rotation between the profiled helical surface and the carriage to drive the carriage along the track and the profiled helical surface.

DETAILED DESCRIPTION

Figure 1:
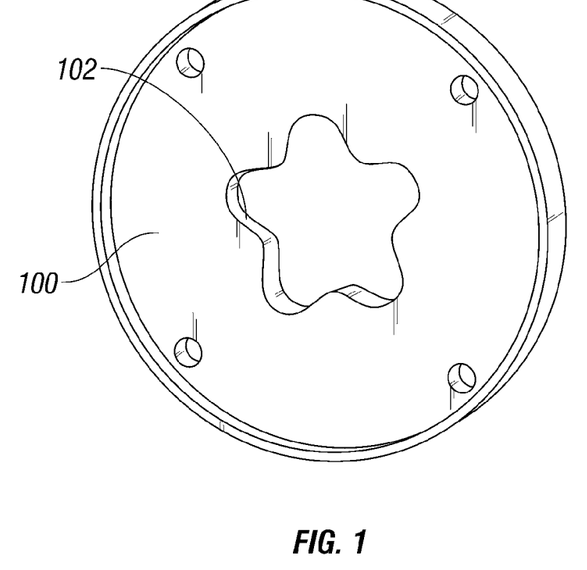
FIG. 1 is a perspective view of a template for use with a rotor, according to one embodiment of the invention.

FIG. 1 illustrates one embodiment of a template 100, for use in extruding a layer of elastomer onto a profiled helical surface. The term profiled shall refer to a non-circular cross-section, for example, a lobed or corrugated cross-section of a rotor (FIG. 5) or a stator (FIG. 6) for use as a power section of a progressive cavity apparatus. The term template, as used herein, shall refer to an element having at least one profiled interior or exterior surface, which can be a helical surface, with a shape substantially similar to that of an adjacent profiled helical surface. The shape of the template can permit a gap between a profiled surface of the template and the adjacent profiled helical surface to be coated. A template can be disposed around an exterior profiled helical surface, for example the exterior surface of the rotor in FIG. 5, or disposed within an interior profiled helical surface, for example the interior surface of the stator in FIG. 6. The gap can be circumferential to the profiled helical surface, for example, a tube.

The template in FIG. 1 has an aperture 102 that is sized and profiled respective to the profiled, or lobed, helical surface onto which the elastomer can be deposited (see FIG. 4), to create the desired thickness and/or orientation of elastomeric coating. For example, with a profiled helical surface, the aperture 102 can have a profiled helical shape (see 102 in FIG. 1) or have a profiled linear shape (not shown). Although the template 100 is shown with a circular outer perimeter, it can be any shape. The template 100 can be of any thickness desired. The template can include a heat source to aid in the extrusion process.

Figure 2:
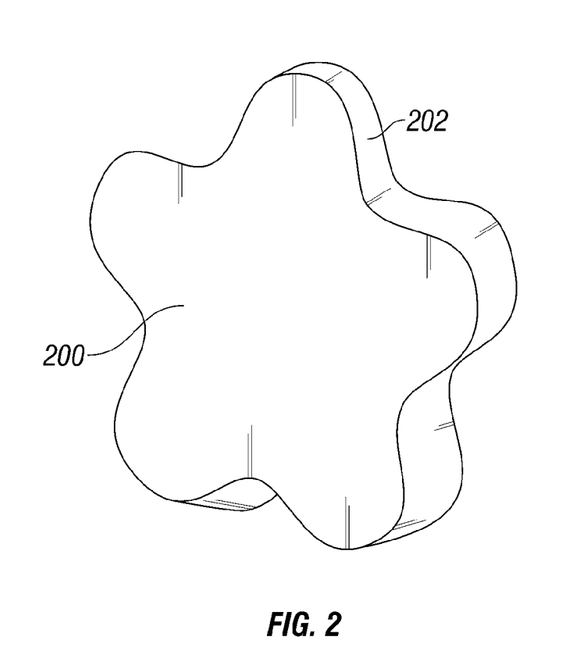
FIG. 2 is a perspective view of a template for use in a stator, according to one embodiment of the invention.

To use, the template 100 is disposed adjacent to a profiled helical surface, for example, the exterior surface of a rotor. In a typical die for extruding an elastomeric tube, the extrusion gap is formed between a mandrel and a land (also referred to as a die aperture or bearing) in the cap of the die itself. An example of a profiled helical tube formed by extrusion is found in Published US Patent Application 2008-0023863, herein incorporated by reference. The present invention allows a gap to be formed between the exterior surface of a rotor (or interior surface of a stator with a template as shown in FIG. 2) and the template 100. Thus, the surface of a rotor or stator can be used as a substitute to the mandrel or land of the extrusion die. The gap is typically oriented such that it is continuous around the circumference. Thus a thick or relatively thin layer of elastomer can be extruded onto the profiled helical surface. Due to the viscous nature of an elastomer, it cannot typically be spray deposited. However, an elastomer can be extruded through this gap and onto the profiled helical surface to form the elastomeric coating. Means for extruding the elastomer through the gap can include a hydraulic or mechanical press, for example, a screw press, or any other extrusion power means known in the art.

Relative movement between the template and rotor surface can then be added to facilitate extrusion along the surface of the stator. The profiled helical shape of the aperture 102 of the template 100 permits a gap therebetween, and any elastomer extruded therethrough, to be of uniform thickness due to the parallel aperture and rotor surfaces. An optional adhesive can be applied to the helical profiled surface before extrusion to aid in the adhesion of the elastomeric coating by one or more spray nozzles, template, and/or brushes. An optional cleaning step can remove any pre-existing elastomeric coating and/or contaminants by chemical, thermal, hydraulic, cutting, scraping, and/or abrasive action. After extrusion, the elastomeric coating can then be cured by any means known in the art, which can include using pressure, heat, ultraviolet light, and/or the passage of time.

Similarly, if an elastomeric coating is to be formed on the profiled helical interior surface of a stator, a template 200 with an outer profiled helical surface 202 such as in FIG. 2 can be utilized. The outer surface 202 of the template 200 can be sized and profiled respective to the profiled helical surface onto which the elastomer can be deposited. The outer surface 202 of the template 200 can be helical, as shown, to allow the gap therebetween, and thus any elastomer extruded therethrough, to be of uniform thickness. To use, the template 200 is disposed within the bore of a stator. As above, an elastomer can then be extruded through the gap formed therebetween to form the elastomeric coating.

To allow the template (100, 200), to follow the helical pattern of the profiled surface, a tracking mechanism can be used. A tracking mechanism can be retained into contact with the profiled helical surface or can be resiliently held against the profiled helical surface, of a stator or rotor for example. The resilient force can be through a wheel constructed of a resilient material, for example, urethane, or by adding a shock absorbing member to the tracking mechanism. A plurality of tracking mechanisms can be used. A tracking mechanism allows the template, or carriage, to follow the contours of the profiled helical surface as relative movement is imparted between the template and profiled helical surface.

In a preferred embodiment, the longitudinal axis of the template and the longitudinal axis of the profiled helical surface remain concentric during the relative movement therebetween. A tracking mechanism can be a wheel, track, or skid, for example. A tracking mechanism can ride in the valley between each lobe of the profiled surface (see FIG. 3B) to follow the helical pattern. A tracking mechanism can include a wheel with the outer surface shaped as a channel. This incurvate channel can allow the wheel to ride along the apex of a lobe of the profiled helical surface. To aid in positioning the template with respect to the profiled helical surface, at least one displacement servo can be attached to the template to correct any positioning errors to maintain a desired or preferred orientation. The displacement servo can be disposed between a template and the tracking mechanism. A plurality of displacement servos can allow for three dimensional adjustment of the template.

Figure 3A:
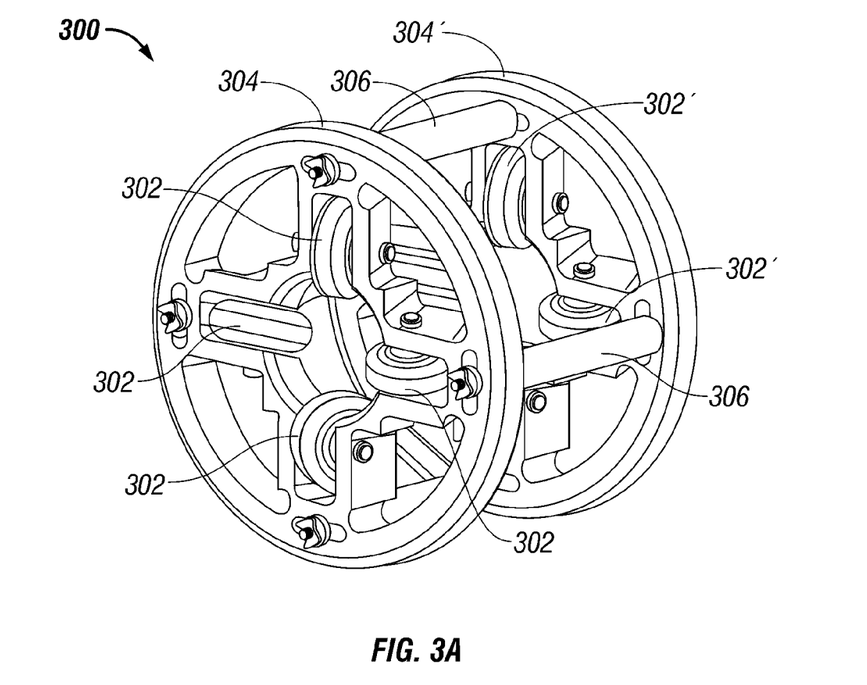
FIG. 3A is a perspective view of a carriage with multiple tracking mechanisms, according to one embodiment of the invention.
Figure 3B:
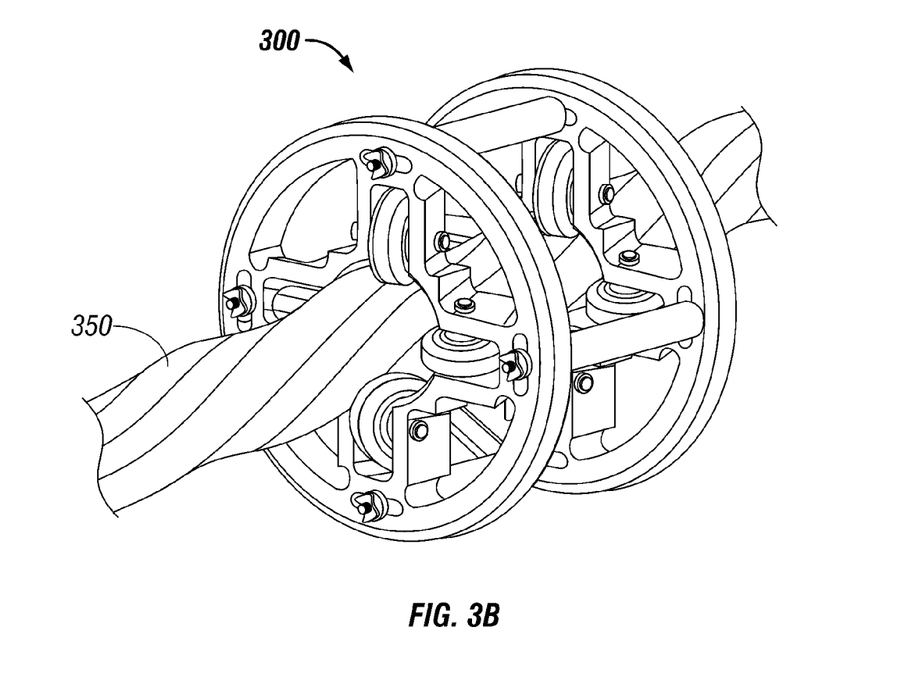
FIG. 3B is a perspective view of the carriage of FIG. 3A disposed on a profiled helical surface.

FIG. 3A illustrates a carriage 300 with a plurality of tracking mechanisms (302, 302') mounted to each circular body member (304, 304'). The circular body members (304, 304') can be spaced further apart by using longer connecting members 306. Although two circular body members (304, 304') are illustrated, any means for mounting the tracking mechanisms (302, 302') to the carriage 300 can be utilized. Similarly, any means for mounting a tracking mechanism directly to a template (100, 200) can be used. FIG. 3B illustrates the plurality of tracking mechanisms (302, 302') retained against a profiled helical surface 350 of a rotor, for example. A tracking mechanism (302, 302') can be resiliently held against the profiled helical surface if so desired by any means known in the art. A single tracking mechanism can be attached directly to a template (100, 200) itself, and does not require the use of a carriage 300 as shown in FIGS. 3A-3B. Although illustrated as tracking an exterior profiled helical surface 350 (for example, with template 100), the tracking mechanisms (302, 302') can be utilized with a stator template 200. In such a configuration, the tracking mechanism can be mounted such that they contact the interior profiled helical surface. For example, the wheels (302, 302') can be mounted on the exterior of the carriage 300 and/or template and the carriage and/or template disposed within the bore of the stator. Although four adjacent tracking mechanisms (302, 302') are shown on each circular body member (304, 304') of the carriage 300, four are not required. The number of members used can depend on the number of lobes of the profiled helical surface and/or the amount of support needed, for example, a single member can be used if substantially all of the weight of the template is supported by other means. Similarly, the number of tracking mechanism used can depend on the amount of support needed and/or the number of lobes of the profiled helical surface and is not limited to sets of four as shown in the Figures.

Figure 5:
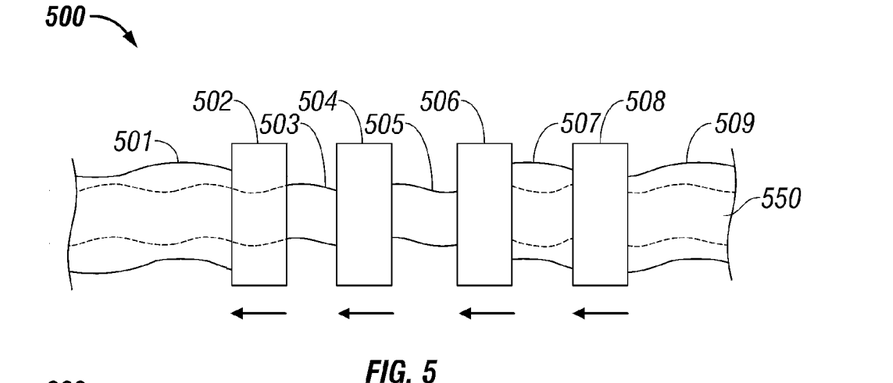
FIG. 5 is a schematic view of an automatic elastomer depositing apparatus disposed on a rotor, according to one embodiment of the invention.
Figure 6:
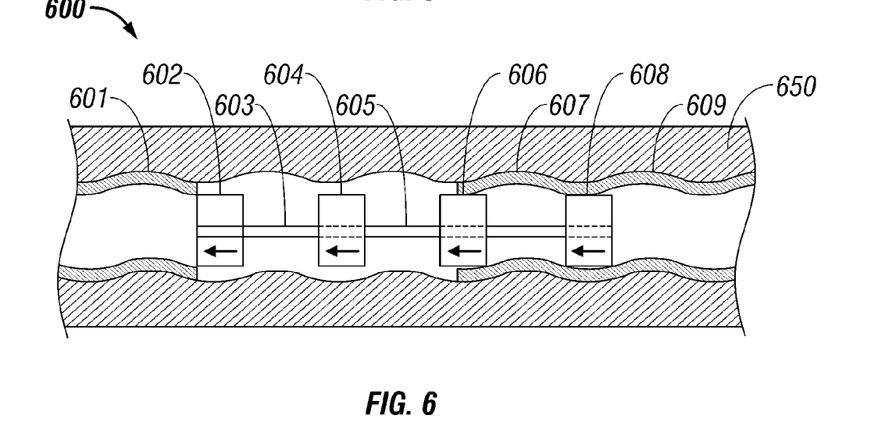
FIG. 6 is a schematic cross-sectional view of an automatic elastomer depositing apparatus disposed in the profiled helical bore of a stator, according to one embodiment of the invention.

A carriage 300 can also allow for the mounting of a cleaning module, an adhesive application module, an elastomer deposition module, and/or a curing module, as discussed in reference to FIGS. 5-6. Each module can include a template, for example, the elastomer deposition module can include a template and a source of an elastomer in communication with the gap formed between the template and the profiled helical surface to be coated.

A tracking mechanism can include a drive apparatus, for example, the drive apparatus can be connected to a wheel to advance the tracking mechanism, and thus any template connected thereto, along the profiled helical surface.

Figure 4:
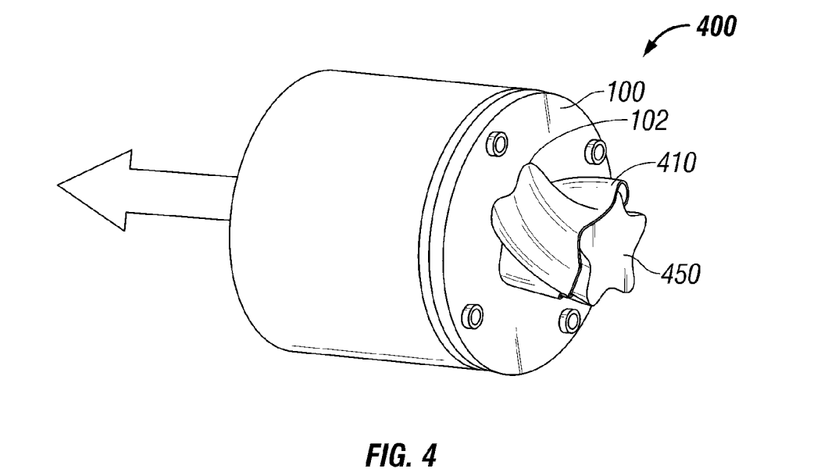
FIG. 4 is a perspective view of the extrusion of an elastomer on a profiled helical surface using the template of FIG. 1, according to one embodiment of the invention.

Referring now to FIG. 4, one apparatus for extruding an elastomeric coating is shown. The extruder module 400 includes a source of elastomer (not shown), which can be a hydraulic or mechanical press, in communication with a gap formed between an aperture 102 of the template 100 and the exterior surface of the rotor 450.

In use, a profiled helical surface, for example, a rotor 450, is disposed within the profiled helical aperture 102 of the template 100 to allow in-situ extrusion of an elastomer. The profiled helical aperture 102 and the profiled helical exterior surface of the rotor 450 are design adjustable to create a gap therebetween. This gap can be of uniform or varying thickness around the circumference, as is known in the art. An elastomer can then be extruded through the gap by any means know in the art. A supply of elastomer can be carried by the extrusion means itself, for example, a double screw press, or supplied by umbilical to the extrusion means. The gap can be substantially the thickness of the formed elastomeric coating 410 if the elastomer retains its as extruded dimensions after curing, if required.

Relative movement can then be provided between the template 100 and the rotor 450 during extrusion to permit the template to track the rotor's 450 helical surface, and accordingly coat the rotor with a desired thickness of elastomeric coating 410. The rotor 450 can be coated with an adhesive prior to extrusion to aid in the adhesion of the elastomeric coating 410 to the profiled helical surface. Relative movement can be imparted by mechanical or electromagnetic force applied to one or both of the profiled helical surface 450 and template 100, for example, a template and/or a rotor can be moved by driving a wheel or set of wheels connected to the template and resiliently held against the rotor surface along the helical pattern of the rotor. By disposing at least one tracking mechanism substantially parallel to the path formed by a lobe or valley of the profiled helical surface, at least one tracking mechanism, for example a wheel, can be powered to create the relative movement between template and rotor, for example. A wheel can have an outer surface that allows for traction between the wheel and the rotor surface, which is typically smooth steel.

If primarily relative axial movement between the longitudinal axis of the rotor 450 and the longitudinal axis of the template 100, as defined by the helix of each, is imparted, rotation of the template 100 about the longitudinal axis of the rotor 450 can also be added to permit the template 100 to track the helical pitch of the rotor 450. The relative axial movement can be achieved by powered means, for example an electric motor rotating the template and/or rotor, or unpowered means, for example at least one tracking mechanism immovably, but can be adjustable, connected to the template to tracks the surface of the rotor, but allowing for movement between the profiled helical surface and the tracking mechanism, for example, the rotation of a wheel. Due to the helical pattern, the tracking mechanism can serve as a guide to allow the template to rotate about the axis of the rotor, or stator, as relative axial movement is imparted between the template and rotor, or stator.

Relative axial movement can be achieved by mechanical or electrical means, for example, by powering a drive wheel against a surface, said surface not limited to the profiled helical surface but can be, for example, a planar surface extending substantially parallel to the longitudinal axis of the rotor.

Referring again to FIG. 4, at least one tracking mechanism (not shown) can be used to allow the template 100 to track the profiled helical surface of the rotor 450 during relative movement therebetween. The rate of relative movement between the adjacent template 100 and rotor 450 surfaces can depend on the extrusion rate and/or the desired thickness of elastomer 410 to be formed. Similarly, the rate of extrusion can be modified to correspond to a desired rate of traversal and/or thickness of elastomer 410. After deposition of the elastomer 410, a section of, or the entirety of, the elastomeric coated rotor 410 can be cured in-situ, or placed in an oven or other curing device. Relative movement can also be achieved through the use of an optional rotational drive apparatus, guide, and track assembly as discussed in reference to FIG. 5. A rotor is used for exemplary purposes, a stator or any other profiled helical surface can be coated with elastomer without departing from the spirit of the invention.

Although FIG. 4 illustrates extruding a layer of elastomer on the exterior surface of a rotor 450, the interior surface of a stator, as shown in FIG. 6, can be coated with an elastomer without departing from the spirit of the invention, for example, by extruding an elastomer using the template of FIG. 2. In the stator embodiment, relative axial movement can be achieved by mounting template to a rod and disposing the rod through the bore of the stator. In such an embodiment, it can be desirable to add a rotational apparatus, for example roller bearings, between the template and the rod to allow rotation between the rod and the template. This enables the rod to be disposed axially through the bore while the tracking member tracks the profiled helical surface and imparts rotation to the template. Further, relative movement can be imparted between the stator bore and the template by driving a tracking mechanism, as disclosed in reference to FIG. 4.

FIG. 5 illustrates one embodiment of an apparatus for redressing a profiled helical surface having a pre-existing elastomeric coating. An automatic elastomer depositing apparatus 500 is shown disposed over the profiled helical exterior surface of a rotor 550. The rotor is shown with a pre-existing elastomeric coating 501 formed on the profiled helical surface of the rotor 550 with dotted lines indicating the profiled helical exterior surface of the rotor 550. The automatic elastomer depositing apparatus 500 can include a cleaning module 502, an adhesive application module 504, an elastomer deposition module 506, and a curing module 508. A module (502, 504, 506, 508) can have an active surface that is fully disposed around the circumference of the rotor 550 or that is point focused and rotated around the longitudinal axis of the rotor 550 to allow for use at any point on the circumference.

The cleaning module 502 can remove a pre-existing elastomeric layer 501, if present, through any means known in the art. The cleaning module 502 can clean any contaminants from the exterior surface of the rotor 550, for example, rust or scale. The cleaning module 502 can utilize heat, chemical, cutting, scraping, and/or abrasive action.

The adhesive application module 504 can apply a thin controlled layer of adhesive through any means known in the art, if the use of adhesive is desired. For example, an adhesive application module 504 can include one or more spray nozzles and/or brushes. An adhesive application module 504 can include a template to apply a desired thickness of adhesive. A source of adhesive can be provided in communication with the template to dispense the adhesive through the gap between the template and the profiled helical surface. The source of adhesive can be carried by the adhesive application module 504 itself or provided by an umbilical as is known in the art. The umbilical can include a swivel device.

The design and/or orientation of the template relative to the profiled helical surface can control the geometry of the gap. In a preferred embodiment for use with an exterior profiled helical surface, such as the exterior surface of the rotor 550, a template is designed with an aperture whose inner surface is spaced relative to the circumference of the profiled helical surface to create a gap therebetween. The gap can be of variable thickness, for example, around the circumference or of uniform thickness, as is known in the art. A template can have any shape of profiled interior or exterior surface. A template can include a profiled helical aperture (for use with a rotor) or exterior (for use with a stator) surface or a profiled surface with a straight longitudinal aperture or exterior surface. Any of the cleaning module 502, the adhesive application module 504, the elastomer deposition module 506, and the curing module 508 can employ a template.

A template used with an exterior profiled helical surface can have an inner aperture geometry that is relatively smaller than the circumference of the rotor with an elastomeric coating (501, 509). A template thus can have radial slits or other elements to allow the template to expand such that a module with a template, for example the adhesive application module 504, can be removed from the rotor 550.

To allow any module (502, 504, 506, 508), which can include a template and/or a tracking mechanism, to traverse the profiled helical surface, a traversal apparatus can be employed. A traversal apparatus can allow axial and/or radial movement with respect to a module (502, 504, 506, 508) and/or template and the profiled helical surface. The profiled helical surface can be displaced, any module (502, 504, 506, 508) can be displaced, or any combination thereof.

A traversal apparatus can include a drive apparatus to impart relative movement between the automatic elastomer depositing apparatus 500 and the profiled helical surface and/or include a tracking mechanism to allow the automatic elastomer depositing apparatus 500 to track the profiled helical surface along the helix. A wheel, skid, or a continuous belt can be used as a tracking mechanism. The tracking mechanism can be resiliently held against the profiled helical surface and connected to a module (502, 504, 506, 508) and/or template. For example, if at least one wheel is used as a tracking mechanism, the wheel can be retained against any portion of the profiled helical surface to track the profiled helical surface. A profiled helical surface typically includes multiple lobes, with an apex of each lobe and a valley between each lobe. A wheel, or plurality of wheels, can, for example, be disposed in a valley and/or against an apex of a lobe. When relative movement is imparted between the wheel and the profiled helical surface, the wheel can track the profiled helical surface. By connecting the wheel and/or other tracking mechanism to a module (502, 504, 506, 508) and/or template, the module and/or template can track the contours of the profiled helical surface as the module and/or template is disposed down the axis of the profiled helical surface. An apex of a lobe of a profiled helical surface, for example the rotor 550, can thus remain adjacent a lobe of a template with a profiled aperture, if utilized, during movement of the profiled helical surface with respect to the template. As the tracking mechanism, and any module (502, 504, 506, 508) and/or template connected thereto, is disposed along the axis of the profiled helical surface, the tracking mechanism follows the contours of the profiled helical surface by rotating at the same pitch of the profiled helical surface. This can allow the gap to remain uniform with respect to the full length of the profiled helical surface as a module (502, 504, 506, 508) and/or template is disposed along the surface of the profiled helical surface.

As a module (502, 504, 506, 508) and/or template can be susceptible to positioning errors with respect to a desired alignment with the profiled helical surface, at least one displacement servo can be utilized. A plurality of displacement servos can allow independent radial movement with respect to each module (502, 504, 506, 508), tracking mechanism, template, and/or the profiled helical surface. A displacement servo can allow precise control of the gap formed between a template and the adjacent section of the profiled helical surface. The displacement servo, for example, can be connected between a template, if used, and a module (502, 504, 506, 508) or tracking mechanism.

The invention can also include an elastomer deposition module 506 which deposits an elastomeric coating 507 on the profiled helical surface. The means for depositing an elastomeric coating 507 can include means for extrusion, one or more spray nozzles and/or brushes, or any other means known in the art for depositing an elastomeric coating. In a preferred embodiment, an elastomer deposition module 506 includes at least one template, as disclosed above and means for extruding an elastomer through the gap. In an embodiment for use with a rotor 550, a template is designed with an inner surface of an aperture that creates a desired gap between the template and the profiled helical surface. Any template can have a profiled helical or non-helical surface without departing from the spirit of the invention. A source of an elastomer is in communication with the gap and the elastomer is extruded or otherwise disposed onto the profiled helical surface, shown in FIG. 5 as an exterior surface of a rotor 550, through the gap. The design of the gap can control the thickness of the elastomeric coating 507. The gap, and consequentially the elastomeric coating 507, can be of variable thickness or of uniform thickness, as is known in the art. The source of elastomeric coating can be carried by the elastomer deposition module 506 itself or provided by an umbilical as is known in the art. The umbilical can include a swivel device.

The curing module 508 can apply heat, light, or otherwise cure the elastomeric coating through any means know in the art. A template can be utilized if desired to ensure uniform curing, for example, uniform heat application through a profiled heating coil.

In use, the automatic elastomer depositing apparatus 500 is disposed against the profiled helical exterior surface of a rotor 550, which can have a pre-existing elastomeric coating 501. Relative movement is then imparted between the automatic elastomer depositing apparatus 500 and the profiled helical surface of the rotor 550. The automatic elastomer depositing apparatus 500 can allow movement of each respective module (502, 504, 506, 508) in unison or individually. The relative movement can be imparted through any type of traversal apparatus or traversal means.

During the relative movement, the cleaning module 502 can remove any pre-existing elastomeric coating 501 and/or other contaminants to expose the rotor surface 503. Adhesive can then be applied to the cleaned rotor surface 503 with an adhesive application module 504, which can include a template tracking the profiled helical surface with at least one tracking mechanism. An elastomeric coating 507 is then applied to the adhesive coated surface 505 with the elastomer deposition module 506, which can include a template tracking the profiled helical surface with at least one tracking mechanism. The uncured elastomeric coating 507 can then be cured with the curing module 508, to create a rotor 550 with a cured elastomeric coating 509. Although the curing module 508 is illustrated in FIG. 2 as disposed totally within the bore of the stator 650, this module can optionally include a component located exterior to the stator 650. This exterior component can be used to apply heat from the outside of the stator 650 or simply as an insulating mechanism for controlling the temperature of the portion of the stator 650 being processed.

The automatic elastomer depositing apparatus 500 can allow any of the modules to be activated at any time. For example, all of the modules (502, 504, 506, 508) can act on the profiled helical surface concurrently. This can allow the redressing of an elastomeric coating 509 with one pass of the automatic elastomer depositing apparatus 500 along the profiled helical surface of the rotor 550.

Any means known in the art can be utilized to provide relative movement between any of the respective modules (502, 504, 506, 508) and the profiled helical surface of the rotor 550. The means for providing relative movement can be a separate traversal module for use in addition to the other modules (502, 504, 506, 508) or each respective module (502, 504, 506, 508) can include its own respective traversal apparatus. To provide relative movement between the modules (502, 504, 506, 508) and the profiled helical surface of the rotor 550, a carriage can be employed. The carriage can allow the mounting of any of the modules (502, 504, 506, 508) in combination or alone. A plurality of carriages can be used without departing from the spirit of the invention. A carriage can be formed with a flexible connection between the modules (502, 504, 506, 508). A carriage can include at least one traversal apparatus, for example, a drive apparatus and/or tracking mechanism to allow the carriage to track the profiled helical surface. A drive apparatus and/or tracking mechanism can be mounted anywhere on the carriage and/or on the modules (502, 504, 506, 508). A drive apparatus and/or tracking mechanism can form a separate module which is attached to the carriage. A carriage embodiment is preferably utilized with a profiled helical surface with a constant pitch. If a carriage is used, a plurality of tracking mechanisms can be employed to support the entire automatic elastomer depositing apparatus 500 against the profiled helical surface.

In a preferred embodiment, at least one tracking mechanism is disposed between the cleaning module 502 and the adhesive application module 504 to allow the tracking mechanism to contact the cleaned rotor surface 503. In a preference embodiment, the configuration of tracking mechanisms shown in FIGS. 3A-B can be disposed on the cleaned rotor surface 503 and connected to a carriage. The use of two sets (304, 304' in FIG. 3A) of adjacent tracking mechanisms can allow for increased stability, however, any number of tracking mechanisms and/or sets of adjacent tracking mechanisms can be used without departing from the spirit of the invention.

The tracking mechanism, for example, a wheel, can include a drive apparatus connected thereto to drive the cleaning module along the profiled helical surface. The tracking mechanism can be attached to a template, if present. A traversal apparatus can include a separate drive mechanism to propel the traversal apparatus with respect to the profiled helical surface independent of the presence of a tracking mechanism. A traversal apparatus can include any means to provide relative axial and/or radial movement.

A carriage is not required and relative movement can be imparted to each module (502, 504, 506, 508) with respect to the profiled helical surface of the rotor 550, independent of the other modules. For example a module (502, 504, 506, 508) can include its own respective traversal apparatus, for example, a tracking mechanism and/or drive apparatus. Each respective tracking mechanism can have a drive apparatus which is connected to the tracking mechanism, for example, a wheel, to provide relative movement between the module (502, 504, 506, 508) and the profiled helical surface. Each module can have a differing rate of traversal. The physical gap between the modules, independent of the use of a carriage, and/or speed at which the automatic elastomer depositing apparatus 500 functions can be dependent upon the traction of the means for relative movement, the speed at which each module can be moved, the cleaning, adhesive application, elastomeric coating deposition, and curing process times, amount of radiated heat during the curing process, and/or vibration. Each module (502, 504, 506, 508) can be moved independently or in a coordinated movement with the other modules depending on the desired rate of traversal for each respective module. If a carriage is used, the carriage can be moved at a rate equal to the rate of the slowest traversing module (502, 504, 506, 508).

An optional rotational drive apparatus can allow rotation of the profiled helical surface, for example about a longitudinal axis. If an optional rotational drive apparatus is used, a traversal apparatus can include at least one track extending in a straight line parallel to the longitudinal axis of the profiled helical surface. A guide is provided to follow the track, with the guide being attached to a carriage or a module (502, 504, 506, 508). A carriage or a module (502, 504, 506, 508) can include a tracking mechanism, for example a wheel. As the profiled helical surface, for example the rotor 550, is rotated about the axis, a tracking mechanism follows the contours of the profiled helical surface. By connecting the tracking mechanism to a guide which follows a straight line track, the rotation of the profiled helical surface is translated into axial movement of the carriage or module (502, 504, 506, 508) to which the tracking mechanism and guide are attached, similar to a threaded connection advancing against another threaded connection, for example, the interaction of a nut and bolt.

Each module (502, 504, 506, 508) of the automatic elastomer depositing apparatus 500 can compete its respective process on a desired section of profiled helical surface before activating the next respective module. For example, the entire profiled helical surface of the rotor 550 can be cleaned with the cleaning module 502, then the adhesive application module 504 can apply a coating of adhesive on the entire profiled helical surface of the rotor 550, the elastomer deposition module 506 can then deposit an elastomeric coating on the entire profiled helical surface of the rotor 550, and the curing module 508 can cure the entire profiled helical surface of the rotor 550.

The invention can include the removing, applying, depositing, and curing steps in the same axial direction along the profiled helical surface. The invention can include removing, applying, depositing, and curing in a reciprocating manner, for example, one module (502, 504, 506, 508) acting from a first end of the rotor 550 to the opposing second end of the rotor 550, and a second module acting from the second end to the first end. Either of these embodiments preferably include means to traverse the profiled helical surface in two opposing directions.

Referring now to FIG. 6, an automatic elastomer depositing apparatus 600 is shown disposed within the profiled helical interior surface of a stator 650. The automatic elastomer depositing apparatus 600 can be used for redressing a profiled helical surface having a pre-existing elastomeric coating 601. The automatic elastomer depositing apparatus 600 illustrated includes a cleaning module 602, an adhesive application module 604, an elastomer deposition module 606, and a curing module 608, as discussed in reference to FIG. 5.

The cleaning module 602 can remove a pre-existing elastomeric layer 601, if present, through any means known in the art. The cleaning module 602 can clean any contaminants from the interior profiled helical surface of the stator 650, for example, rust or scale. The cleaning module 602 can utilize heat, chemical, cutting, scraping, and/or abrasive action. As a stator body is typically a bore, the cleaning module 602 can also include means for removing the cleaning residue and/or removed portions of pre-existing elastomeric coating 601, for example, a vacuum device.

The adhesive application module 604 can apply a thin controlled layer of adhesive through any means known in the art, if the use of adhesive is desired. For example, an adhesive application module 604 can include one or more spray nozzles and/or brushes. An adhesive application module 604 can include a template to apply a desired thickness of adhesive therebetween. A source of adhesive can be provided in communication with the template to dispense the adhesive through a gap between the template and the profiled helical surface of the stator 650. The source of adhesive can be carried by the adhesive application module 604 itself or provided by an umbilical as is known in the art. The umbilical can include a swivel device.

In contrast to the template disclosed in reference to FIG. 5, when used on a profiled helical interior surface of a stator 650 as in FIG. 6, a template can have an outside surface that preferably is profiled. The design and/or orientation of the template relative to the profiled helical surface can control the geometry of the gap. In a preferred embodiment for use on a profiled helical interior surface, such as a stator 650, a template is designed with an outer surface spaced relative to the circumference of the bore of the profiled helical surface to create a gap therebetween. The gap can be of variable thickness or of uniform thickness, as is known in the art.

As the bore of a stator is a profiled helical surface, it can be desirable to allow a module (602, 604, 606, 608), which can include a template, to track the profiled helical surface with at least one tracking mechanism. A tracking mechanism can include, for example, a wheel, skid, or a continuous belt. The tracking mechanism can be resiliently held against the profiled helical surface and connected to a module (602, 604, 606, 608) and/or template. For example, if at least one wheel is used as the tracking mechanism, it can be resiliently held against any portion of the profiled helical surface and can track the profiled helical surface. A profiled helical surface typically includes multiple lobes, with an apex of each lobe and a valley between each lobe. A wheel, or plurality of wheels, can be disposed in a valley and/or against an apex of a lobe, for example. When relative movement is imparted between the wheel and the profiled helical surface, the wheel can track the profiled helical surface. By connecting the wheel or other tracking mechanism to a module (602, 604, 606, 608) and/or template, the module and/or template can track the contours of the profiled helical surface as the module and/or template is disposed down the axis of the profiled helical surface. An apex of a lobe of a profiled helical surface, for example the stator 650, can thus remain adjacent a lobe of a template with a profiled outer surface, if utilized, during movement of the profiled helical surface with respect to the template. This can allow the gap therebetween to remain of uniform configuration along the length of the axis as a module (602, 604, 606, 608) and/or template is disposed along the profiled helical surface.

As a module (602, 604, 606, 608) and/or template can be susceptible to positioning errors with respect to a desired alignment with the profiled helical surface of the stator 650, at least one displacement servo can be utilized. A plurality of displacement servos can allow independent radial movement with respect to each module (602, 604, 606, 608), tracking mechanism, template, and/or the profiled helical surface. If a template is utilized, at least one displacement servo can allow precise control of the gap formed between the template and the adjacent section of the profiled helical surface. A displacement servo, for example, can be connected between a template, if used, and a module (602, 604, 606, 608) or tracking mechanism.

The invention can also include an elastomer deposition module 606 which deposits an elastomeric coating 607 on the profiled helical surface. The means for depositing an elastomeric coating can include means for extruding elastomer, one or more spray nozzles and/or brushes, or any other means known in the art for depositing an elastomeric coating. In a preferred embodiment, an elastomer deposition module 606 includes at least one template and means for extruding an elastomer through the gap. In the embodiment used in a stator 650, a template is designed with an outer surface that creates a desired gap between the template and the profiled helical surface of the stator 650. The template can have a profiled helical or non-helical surface without departing from the spirit of the invention. A source of an elastomer is in communication with the gap and the elastomer is extruded or otherwise disposed onto the profiled helical surface, shown in FIG. 6 as an interior surface of a stator 650, through the gap. The design of the gap can control the thickness of the elastomeric coating 607.

The curing module 608 can include means for applying heat, light, or otherwise cure the elastomeric coating 607 by any means know in the art. A template can be utilized if desired to ensure uniform curing, for example, uniform heat application through a profiled heating coil.

In use, the automatic elastomer depositing apparatus 600 is disposed against the profiled helical interior surface of a stator 650, which can have a pre-existing elastomeric coating 601. Relative movement is then imparted between the automatic elastomer depositing apparatus 600 and the profiled helical surface of the stator 650. The automatic elastomer depositing apparatus 600 can allow movement of each respective module (602, 604, 606, 608) in unison or individually. The relative movement can be imparted through any type of traversal apparatus or traversal means.

During the relative movement, the cleaning module 602 can remove any pre-existing elastomeric coating 601 and/or other contaminants to expose the stator interior surface 603. Adhesive can then be applied to the cleaned stator interior surface 603 with an adhesive application module 604, which can include a template tracking the profiled helical surface with at least one tracking mechanism. An elastomeric coating 607 is then applied to the adhesive coated surface 605 with the elastomer deposition module 606, which can include a template tracking the profiled helical surface with at least one tracking mechanism. The uncured elastomeric coating 607 can then be cured with the curing module 608, to create a stator 650 with a cured elastomeric coating 609.

A carriage can allow the mounting of any of the modules (602, 604, 606, 608) in combination or alone. A carriage, if used, can connect the modules with a rod extending axially between each module. The carriage can include a drive apparatus. A traversal apparatus can be used to allow a module or a carriage, if present, to traverse the profiled helical surface. A traversal apparatus can include a drive apparatus or at least one tracking mechanism retained or resiliently held against the profiled helical surface. The tracking mechanism can include a drive apparatus.

A traversal apparatus can include a rod extending axially though the bore of the stator 650 and a drive apparatus configured to traverse the rod. Similarly, the rod can be displaced through the bore by means external to the stator 650. A track and guide, as disclosed in reference to FIG. 5, can be utilized with the stator 650 redressing embodiment, with the track contained within the bore of the stator 650.

Although one of each type of module is illustrated in the FIGS. 5-6, a plurality of any or all of the modules can be present without departing from the spirit of the invention. The elastomeric deposition module employing a template and means for extrusion can be used alone, and the other three modules are optional. Relative movement between modules and the profiled helical surface can consist of displacing the module, the profiled helical surface, a carriage, if present, or any combination thereof. Automation means can be utilized without departing from the spirit of the invention.

Figure 7:
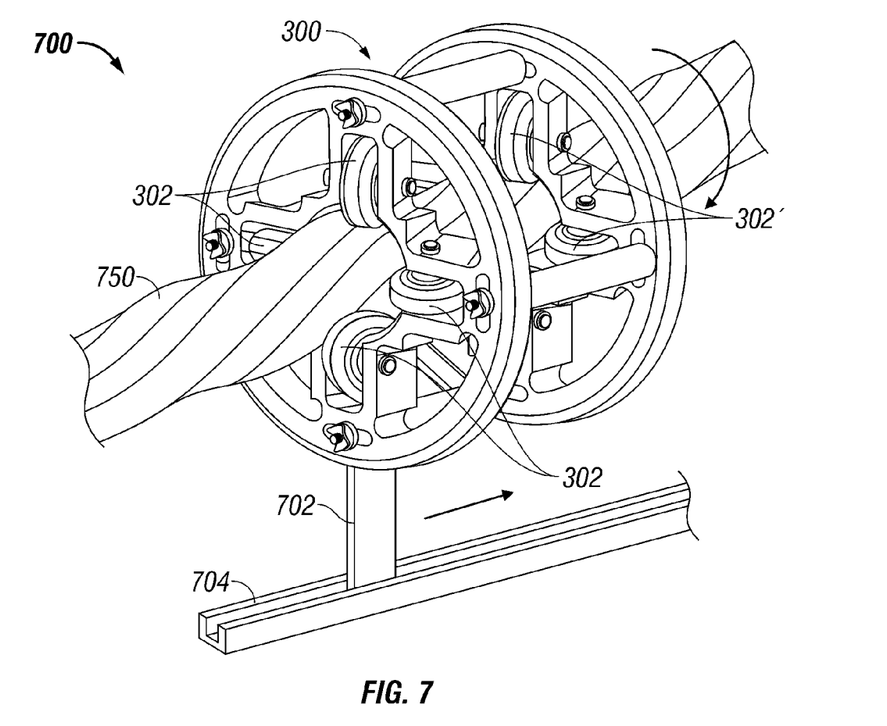
FIG. 7 is a perspective view of a carriage disposed along a track by the rotation of the profiled helical surface, according to one embodiment of the invention.

FIG. 7 illustrates another means for providing relative movement between a carriage 300 and a profiled helical surface, for example, the rotor 750 shown. In use as a traversal apparatus, at least one guide 702 is connected to the carriage 300, which includes a plurality of tracking members (302, 302'). As the rotor 750 is rotated, by any means known in the art, the guide 702 restricts any rotation of the carriage 300 around the longitudinal axis of the rotor 750 by contact with the track 704. The helix shape coupled with the tracking members (302, 302') creates a screw drive to dispose the carriage with respect to the longitudinal axis of the rotor 650. Although illustrated using a carriage 300, the guide and track system can be utilized by attaching the guide 702 to a template (100, 200) instead of the carriage 300. A template (100, 200) may be disposed along the rotor 750 by connection to the carriage 300. More than one track 704 and/or guide 702 can be used as desired, for example, one similar to a railroad. Further, a track 704 and guide 702 system can be used within a stator bore by disposing a track 704 along the longitudinal axis of the bore. In such configuration, a stator bore template (see 200 in FIG. 2) can include an opening through the center to allow for passage of the track 704. The stator bore template can further include a guide 702. A guide 702 may include wheels or be any type of track 704 and guide 702 as is known in the art. The helical shape of the profiled surface and the tracking mechanism allow for the traversal of the profiled helical surface using only axial rotation of said surface.

Figure 8:
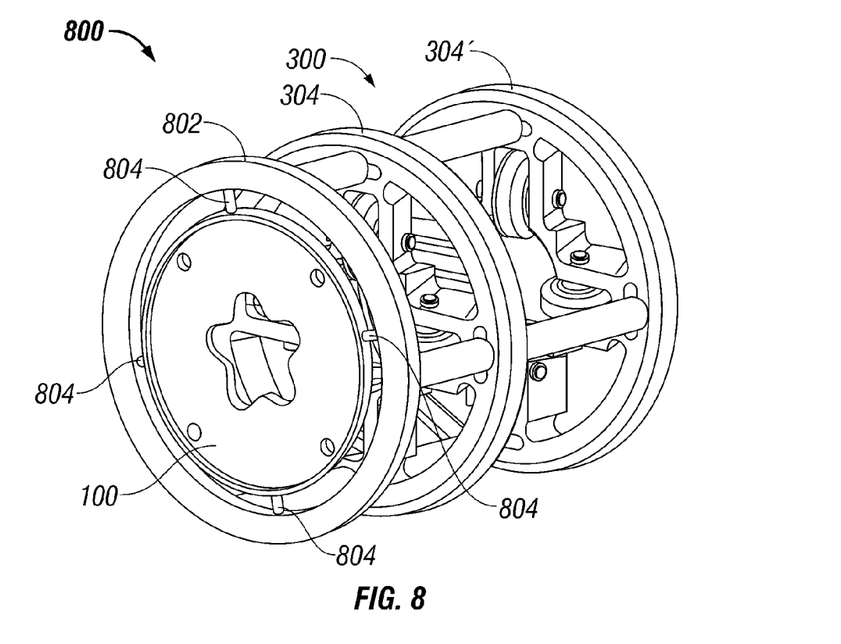
FIG. 8 is a perspective view of a template movably attached to a carriage by a plurality of displacement servos, according to one embodiment of the invention.

Referring now to FIG. 8, a carriage 300 with a template 100 mounted thereto is illustrated. The template 100 is supportably connected to a mounting ring 802 that is rigidly connected to the carriage 300. Although the template 100 is shown disposed on a proximate end of the carriage 300, a template 100 can be disposed between the two circular body members (304, 304') without departing from the spirit of the invention. The template is movably retained to the mounting ring 802 by four displacement servos 804. Although four displacement servos are illustrated, a single or any plurality of servos 804 can be used to adjust the template 100 relative to the profiled helical surface, as is well known by one of ordinary skill in the art. A servo 804 can be mounted in any orientation, so as to provide the desired movement of the template. For example, a servo can allow the template 100 to pitch, roll, yaw, or even rotate, with respect to the mounting ring 802. A displacement servo 804 can allow correction of template 100 positioning errors. This allows a user to maintain a desired gap, and thus a desired thickness of elastomeric coating, between the profiled helical surface of the template and the profiled helical surface to which the elastomer is being deposited, for example, a rotor or stator body.

Numerous embodiments and alternatives thereof have been disclosed. While the above disclosure includes the best mode belief in carrying out the invention as contemplated by the named inventors, not all possible alternatives have been disclosed. For that reason, the scope and limitation of the present invention is not to be restricted to the above disclosure, but is instead to be defined and construed by the appended claims.

What is claimed is:

1. A method of extruding an elastomeric coating onto a progressive cavity motor component having a profiled helical surface comprising:
    providing a component of a progressive cavity motor, wherein the component has a profiled helical surface;
    disposing a carriage with a cleaning module, an adhesive application module, an elastomer deposition module, and a curing module mounted thereto along the profiled helical surface, wherein each of the four modules is point focused or has an active surface that is fully disposed around the component;
    removing a pre-existing elastomeric coating by the cleaning module from a section of the profiled helical surface as the carriage is disposed along the profiled helical surface;
    applying an adhesive by the adhesive application module onto the section of the profiled helical surface where the pre-existing elastomeric coating has been previously removed by the cleaning module;
    extruding an elastomer through a gap formed between a template of the elastomer deposition module and the profiled helical surface onto the section of the profiled helical surface where the pre-existing elastomeric coating has been previously removed by the cleaning module and where the adhesive has been previously applied by the adhesive application module; and
    curing the elastomeric coating with the curing module on the section of the profiled helical surface where the cleaning, adhesive application, and elastomer deposition modules have previously removed the pre-existing elastomeric coating, applied the adhesive, and deposited the elastomeric coating,
    wherein each of the cleaning, adhesive application, elastomer deposition, and curing modules operates while the carriage is driven along the profiled helical surface.

2. The method of claim 1 further comprising positioning the template with at least one tracking mechanism connected to the template and retained against the profiled helical surface.

3. The method of claim 1 further comprising positioning the template with at least one displacement servo disposed between the template and the carriage.

4. The method of claim 1 wherein each of the removing, applying, extruding, and curing steps occurs concurrently.

5. The method of claim 1 further comprising providing relative movement between the carriage and the profiled helical surface during the removing, applying, extruding, and curing steps.

6. The method of claim 1 further comprising providing relative movement between the carriage and each of the cleaning module, the adhesive application module, the elastomer deposition module, and the curing module during the removing, applying, extruding, and curing steps.

7. The method of claim 1 further comprising:
    connecting a guide to the carriage, the guide following at least one track extending in a straight line parallel to an axis of the profiled helical surface;
    connecting at least one tracking mechanism to the carriage, the at least one tracking mechanism retained against the profiled helical surface; and
    imparting relative rotation between the profiled helical surface and the carriage to drive the carriage along the track and the profiled helical surface.

* * * * *